United States Patent [19]

Weld et al.

[11] Patent Number: 4,748,376
[45] Date of Patent: May 31, 1988

[54] HALOGEN LAMP FILL MIXTURE WHICH REDUCES LOWER OPERATING TEMPERATURE OF HALOGEN CYCLE

[75] Inventors: Thomas G. Weld, Chicago, Ill.; Mark D. Beschle, Danvers, Mass.

[73] Assignee: GTE Products Corporation, Danvers, Mass.

[21] Appl. No.: 14,129

[22] Filed: Feb. 3, 1987

Related U.S. Application Data

[63] Continuation of Ser. No. 749,355, Jun. 27, 1985, abandoned.

[51] Int. Cl.$^4$ .............................................. H01K 1/50
[52] U.S. Cl. .................................... 313/579; 313/636; 313/643
[58] Field of Search ................. 313/578, 579, 636, 25, 313/637, 643

[56] References Cited

U.S. PATENT DOCUMENTS

| | | | |
|---|---|---|---|
| 3,641,386 | 2/1972 | Andesse et al. | 313/579 |
| 3,912,960 | 10/1975 | Danco | 313/579 |
| 4,039,879 | 8/1977 | T'Jampens et al. | 313/579 |
| 4,074,168 | 2/1978 | T'Jampens | 313/579 |
| 4,415,834 | 11/1983 | Keenan | 313/578 |
| 4,453,107 | 6/1984 | Keenan | 313/579 |
| 4,532,455 | 7/1985 | Connor et al. | 313/579 |

OTHER PUBLICATIONS

"Lamps and Lighting", 3rd ed., M. A. Cayless et al. (Ed.), pp. 169–173, 1983.

Primary Examiner—David K. Moore
Assistant Examiner—K. Wieder
Attorney, Agent, or Firm—Joseph S. Romanow; Jose' W. Jimenez

[57] ABSTRACT

A tungsten halogen lamp is provided that incorporates therein means for reducing the lower operating temperature limit of the halogen cycle operating within the lamp's envelope. In addition, there is provided a halogen lamp fill gas mixture, which is comprised of an inert gas, a halogen or halide and a phorphorus-based compound and a carbon-containing compound that will reduce the lower operating temperature limit and greatly increase the efficiency of the halogen cycle, thereby allowing operation of a tungsten halogen lamp at temperatures about or below 400°–500° K. The compounds in the fill gas mixture have a phosphorus-to-carbon mass ratio of about 10:1 to about 1:1.

1 Claim, 5 Drawing Sheets

FIG. I

HALOGEN LAMP FILL MIXTURE WHICH REDUCES LOWER OPERATING TEMPERATURE OF HALOGEN CYCLE

This is a continuation of copending application Ser. No. 749,355 filed on 6-27-85, now abandoned.

CROSS REFERENCE TO CO-PENDING APPLICATIONS

In a co-pending Application filed on Feb. 11, 1985 and having Ser. No. 700,361 ("TUNGSTEN-HALOGEN LAMP WITH MEANS FOR REDUCING FILAMENT EMBRITTLEMENT"), now U.S. Pat. No. 4,629,936 there is defined a lamp having two substances, for example, a carbon containing compound and a phosphorus based compound, in a preferred ratio of quantities for the purpose of substantially reducing filament embrittlement leading to reduced lamp life. This Application is filed concurrently herewith and is assigned to the same assignee as the instant invention.

In a co-pending Application having Ser. No. 321,994, now U.S. Pat. No. 4,727,286 ("ELECTRIC LAMP INCLUDING OXYGEN GETTER"), there is defined a lamp containing phosphine gas for the purpose of serving as an oxygen getter. This Application was filed on Nov. 16, 1981 and was assigned to the same assignee as the instant invention.

TECHNICAL FIELD

This invention relates to incandescent lamps, and more particularly to tungsten-halogen incandescent lamps. Still more particularly, it relates to lamps of the variety having a carbonaceous halide as part of the fill gas mixture.

BACKGROUND

Incandescent lamps exhibiting the so-called halogen cycle are well known in the art. Such lamps operate on a tungsten-halogen cycle which is a regenerative, continuous process in which tungsten-halide is produced when the halide combines chemically with particles of tungsten evaporating from an incandescent tungsten filament. Subsequent thermal decomposition of this compound replaces the tungsten particles on the filament. At high temperatures, this process keeps the tungsten particles from depositing on the lamp envelope and producing a black coating which reduces light output.

The halide additive often used is hydrogen bromide (HBr) in its gaseous state. In the vicinity of the lighted filaments the HBr disassociates and forms free bromine (Br) which migrates to the vicinity of the envelope wall where it combines with tungsten which has evaporated from the filament. The bromide taking part in the regenerative cycle is tungsten bromide. If any part of the envelope wall is at or below 473° K. (200° C.), the tungsten bromide will chemically decompose in this region, yielding free bromide and metallic tungsten, the latter of which subsequently condenses on the envelope wall. If, on the other hand, the entire envelope wall is above 473° K. (200° C.), the tungsten bromides will be chemically stable, and will migrate back to the filament. Thus at temperatures below 473° K. (200° C.), the tungsten halogen cycle fails due to the lack of stability of tungsten bromide.

The failure of the halogen cycle to operate efficiently at lower temperatures has caused significant problems in lower wattage lamps which normally have corresponding cooler envelope walls. Specifically, the envelope walls will go black due to metallic tungsten deposits, indicating a failure of the halogen cycle. This will lead to reduced light output and early failure. If this problem could be eliminated, then the advantages of a properly operating halogen cycle could be extended to lamp types previously thought to be operating at too low an envelope wall temperature.

It is believed, therefore, that a halogen lamp and fill gas mixture that reduces the lower operating temperature limit of the halogen cycle and greatly increases its efficiency would constitute a significant advancement in the art.

DISCLOSURE OF THE INVENTION

Therefore, it is a primary object of this invention to overcome the disadvantages of the prior art.

It is another object of this invention to provide a lamp with means for reducing lower operating temperature limit of the halogen cycle, thereby enhancing the performance of a lamp operating at lower envelope wall temperatures.

In accordance with one aspect of the present invention, there is provided a tungsten-halogen incandescent lamp comprising a light-transmitting, hermetically sealed envelope and a tungsten filament disposed within the envelope. In addition, a fill gas mixture is disposed within the envelope and comprises an inert gas, a halogen or a halide and means for reducing lower operating temperature limit of the halogen cycle located within the envelope, the operating temperature reducing means comprising a phosphorus-based compound and a carbon-containing compound. In accordance with another aspect of the present invention, there is provided a tungsten halogen lamp fill gas mixture which reduces the lower operating temperature limit and increases the efficiency of the halogen cycle. The fill gas mixture comprises an inert gas, a halogen or halide, and a phosphorus-based compound along with a carbon-containing compound. The compounds in the fill gas mixture have a phosphorus-to-carbon mass ratio in the range of about 10:1 to about 1:1.

BEST MODE FOR CARRYING OUT THE INVENTION

For a better understanding of the present invention, together with other and further objects, advantages, and capabilities thereof, reference is made to the following disclosure and appended claims in conjunction with the above described drawings.

Figure 1:
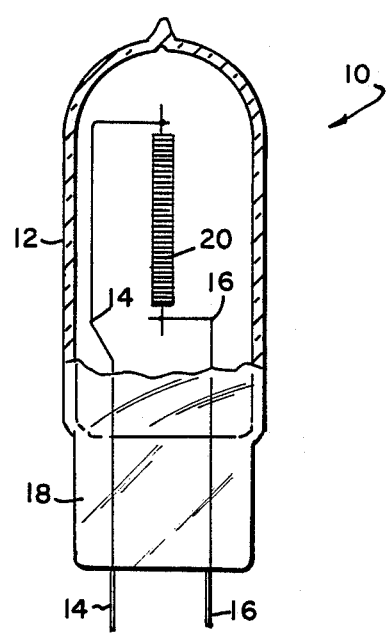
FIG. 1 illustrates one embodiment of a tungsten halogen lamp made in accordance with the teachings of the present invention.

Referring now to FIG. 1 with greater particularity, FIG. 1 shows a tungsten halogen lamp 10 made in accordance with the teachings of the present invention. It is to be understood that lamp 10 is representative of only one of several varieties of electric lamps capable of successfully utilizing the fill gas mixture of the instant invention. Accordingly, the scope of the invention is not to be limited to the particular lamp 10 as shown and described herein below.

Lamp 10 has a tubular envelope 12 made of a suitable light transmitting material such as borosilicate or aluminosilicate glass. A pair of lead-in wires 14 and 16 are press sealed in enveloped 12 at press seal 18. Lead-in wires 14 and 16 are formed from molybdenum, which will form a relatively strain-free hermetic seal with glass envelope 12. A tungsten filament 20, such as a coiled coil, is attached to the internal ends of lead-in wires 14 and 16. Envelope 12 is filled with a fill gas mixture comprising an inert gas, a halogen or halide and means for reducing lower operating temperature limit of the halogen cycle located within envelope 12, the operating temperature reducing means comprising a phosphorus-based compound and a carbon-containing compound. Suitable examples of inert gases include argon, krypton, xenon and nitrogen.

In the past, carbon and phosphorus have been used individually in tungsten halogen lamps for gettering oxygen and other impurities. In the present invention, the appropriate combination of phosphorus and carbon in the tungsten halogen lamp system will reduce the lower operating temperature limit and greatly increase the efficiency of the halogen cycle. The invention involves a halogen lamp fill gas mixture which allows for efficient operation of the halogen cycle at low operating temperatures (i.e., 400°–500° K.), usually for lamps of lower wattage (below 150 watts).

Figure 2:
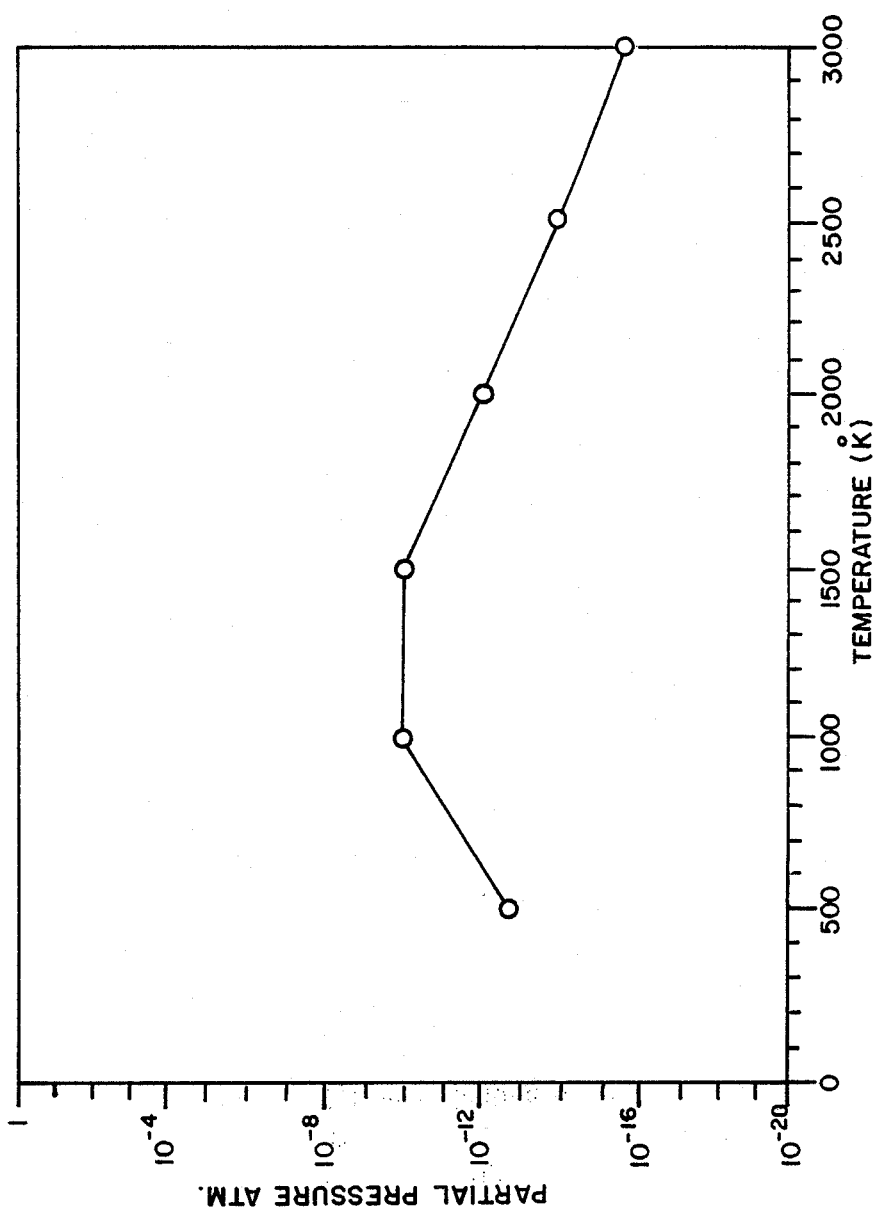
FIG. 2 is a graph that illustrates the tungsten bromide transport for a hydrogen bromide system having phosphorus.
Figure 3:
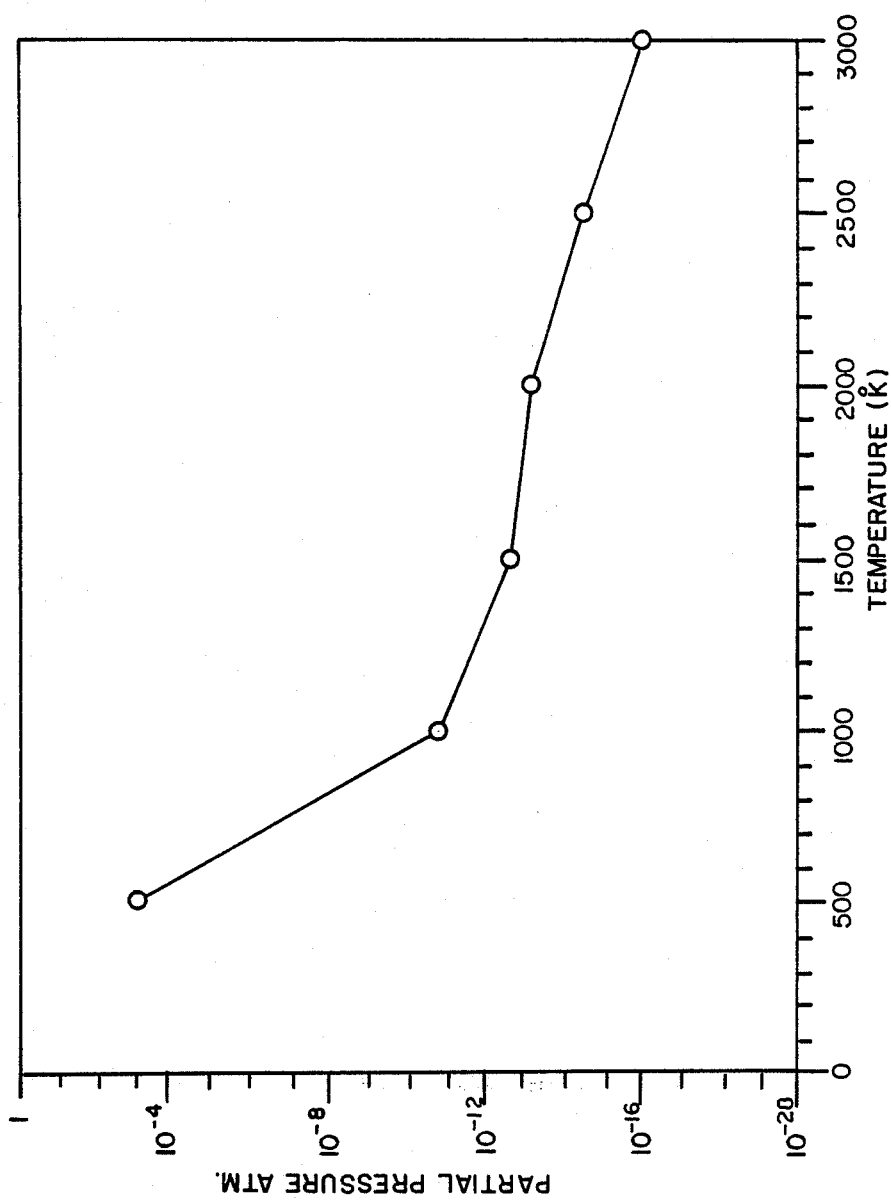
FIG. 3 is a graph that illustrates the tungsten bromide transport in a system having methyl bromide and phosphorus.

Referring now to FIG. 2, FIG. 2 shows a graph that illustrates tungsten bromide ($WBr_x$, where $x=1, 2, 3, 4, 5$ or $6$) transport (the existence of free-floating tungsten bromide) within a system utilizing hydrogen bromide as a halide and that has had phosphorus (P) injected into the system. The graph illustrates that the tungsten halogen cycle in a hydrogen bromide-phosphorus system would tend to fail below a temperature of 1000° K. On the other hand, FIG. 3 is a graph that illustrates the tungsten bromide transport in a system utilizing methyl bromide ($CH_3Br$) as the halide also mixed with phosphorus. This graph illustrates that the tungsten halogen cycle in a methyl bromide-phosphorus system would be very active below temperature of 1000° K. In the case of the methyl bromide phosphorus system, a large increase in efficiency of the halogen cycle was evidenced. In fact, at the peak halogen cycle activity of this system containing carbon (supplied by $CH_3Br$), there exists $10^6$ times as many tungsten bromides as occur at the peak of the system containing no carbon.

A possible explanation as to the availability of extra bromide is now provided. Most of the bromine in a tungsten halogen lamp is tied up in the low temperature range as hydrogen bromide. Hydrogen has long been known to tame the reactivity of excess bromine at and below lead wire temperatures. Taming the reactivity of bromine at lead wire temperatures is very desirable, as it prevents etching and excessive corrosive effects on the lead wires. But, ideally bromine should be most reactive at the lower envelope wall temperatures so it can react with and volatilize any condensed tungsten. The addition of carbon to the bromine-phosphorus system helps the hydrogen bromide approach this ideal behavior.

Figure 4:
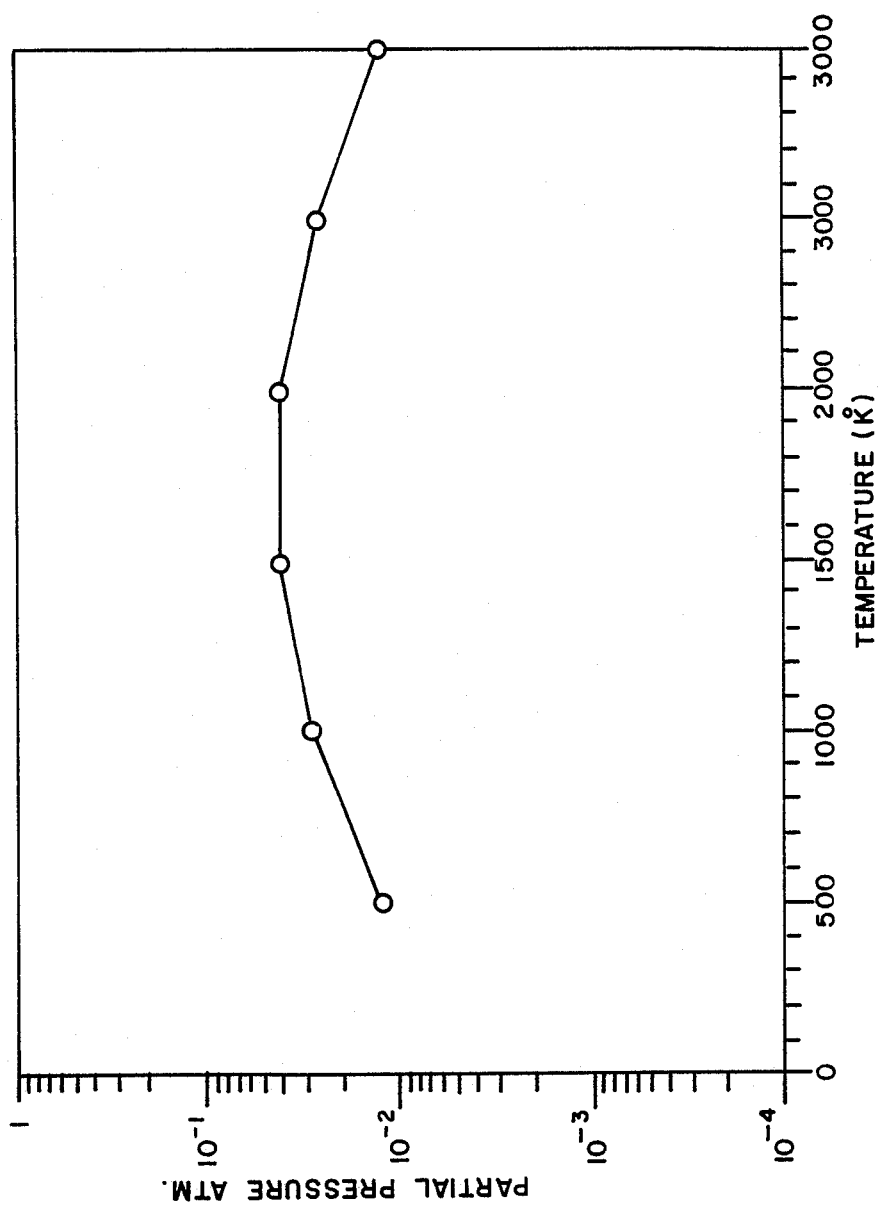
FIG. 4 is a graph illustrating the hydrogen bromide transport in a hydrogen phosphorus system.
Figure 5:
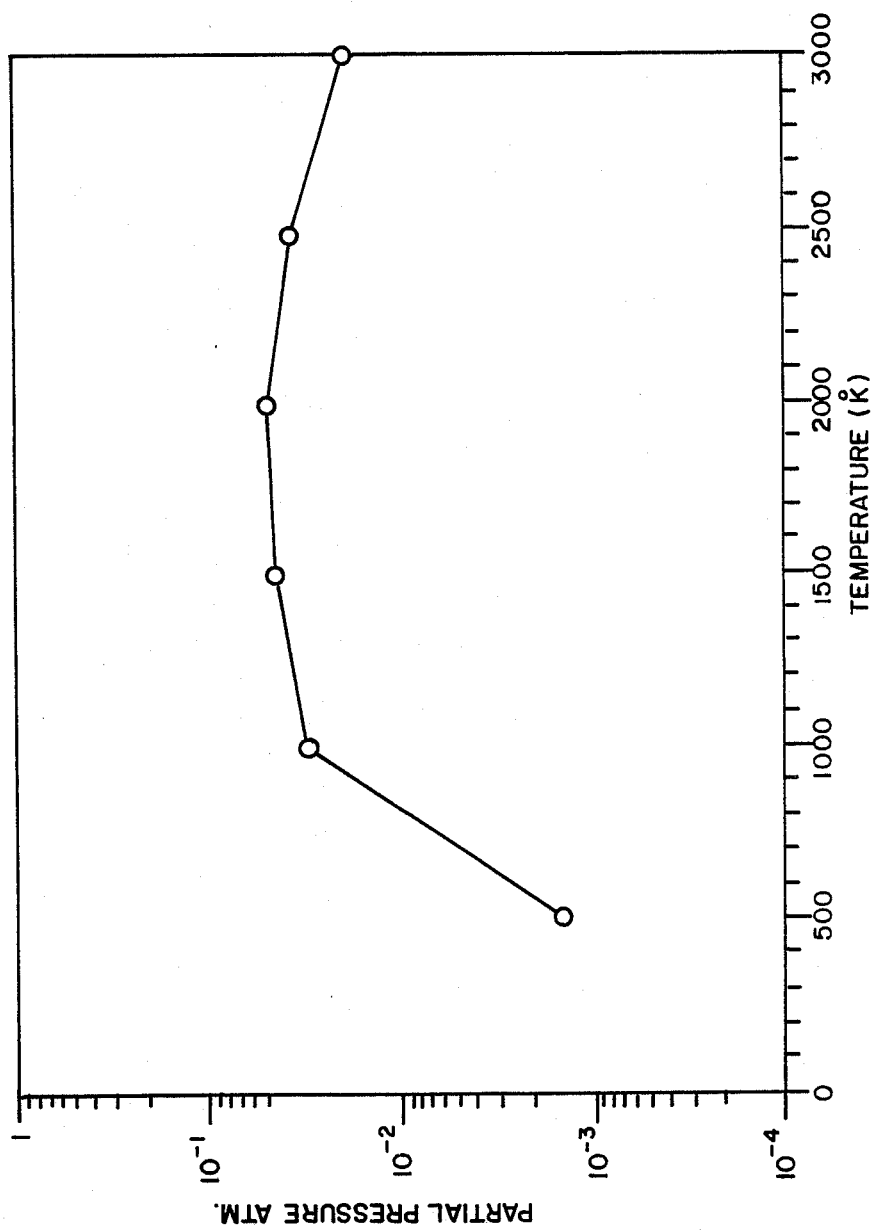
FIG. 5 is a graph illustrating the hydrogen transport in a methyl bromide-phosphorus system.

Carbon reacts with hydrogen bromide at temperatures below 1000° K., stripping hydrogen from bromine to form a hydrocarbon. Above 1000° K., the reaction proceeds in the opposite direction, providing hydrogen to free bromine atoms and taming the overall reactivity of bromine around lead wire temperatures. Carbon serves as a hydrogen source at lead wire temperatures and a hydrogen sink at envelope wall temperatures. This effect is most dramatically illustrated when comparing methyl bromide and hydrogen bromide lamps particularly at FIGS. 4 and 5. For example, in methyl bromide lamps, which contain three times the amount of hydrogen, less hydrogen bromide existed at temperatures below 1000° K.

During experimentation, one of the lowest bulb wall operating temperatures was found in the 45 watt lamp, when burned in the vertical base-up orientation. The walls of a hydrogen bromide-phosphorus lamp of this wattage would go black due to a failure of the halogen cycle. On the other hand, in one of the embodiments of the present invention, a methyl bromide-phosphorus lamp remained clean throughout life, indicating a fully operational halogen cycle. Furthermore, methyl bromide-phosphorus lamps have exhibited far less etch and corrosive effects on leads than corresponding hydrogen bromide lamps. The combination found to be most suitable in the fill gas mixture, and to give a surprising result, was that of the methyl bromide as the carbon-containing compound and phosphine (that provides the phosphorus) as the phosphorus-based compound. The phosphorus-carbon combination should be incorporated in any tungsten lamp operating with low envelope temperatures.

In constructing one embodiment of our lamp, methyl bromide is added to yield the same amount of bromine in the lamp as the present hydrogen bromide mix. The phosphorus is first introduced into lamp 10 in the form of phosphine gas. The phosphine gas is introduced as part of the fill gas mixture so that upon normal phosphorus disassociation from the hydrogen, a particular quantity of phosphorus will result. The methyl bromide-phosphorus lamp is then burned in a vertical base-up orientation. If the lamp blackens initially in the base, it is an indication that the lamp is overdosed with phosphorus. If the lamp blackens in the envelope, probably more methyl bromide, or a combination of methyl bromide and hydrogen bromide yielding the same amount of bromine is desired. In the present invention, the carbon can be added via any carbon-containing compound. Some examples are methyl bromide, dibromo methane ($CH_2Br_2$), bromoform ($CHBr_3$) or cyanogen ($C_2N_2$) gases. The carbon-content resulting from dissassociation is in the range from about 2 to about 20 micrograms of carbon. The phosphorus dosages commonly used here range from about 2 to about 20 micrograms of phosphorus. The phosphorus to carbon mass ratio is in the range of from about 10:1 to about 1:1. We found the optimum phosphorus to carbon ratio to be about 2:1.

Thus, there has been shown and described a tungsten halogen lamp fill gas mixture and halogen lamp having means incorporated therein for reducing lower operating temperature limit of the halogen cycle within the lamp. Particularly, the fill gas mixture which is contained within the lamp and which increases the efficiency of the halogen cycle is comprised of an inert gas, a halogen or a halide and a phosphorus-based compound and a carbon-containing compound. The compounds in the fill gas mixture have a phosphorus-to-carbon mass ratio in the range of about 10:1 to 1:1. The present invention allows for efficient operation of the halogen cycle for lamps having low operating temperatures, such as 400°–500° K.

While there have been shown what are at present to be the preferred embodiments of the invention, it will be apparent to those skilled in the art that various changes and modifications can be made therein without departing from the scope of the invention as defined in the appended claims.

We claim:

1. A tungsten-halogen lamp having commercially feasible maintenance comprising:
   (a) a light-transmitting hermetically sealed envelope enclosing an interior, said envelope being manufactured from a material selected from the group consisting of borosilicate and aluminosilicate glass, said envelope having an interior wall surface, the temperature of said interior wall surface during continuous operation of said lamp being less than two hundred degrees centigrade:
   (b) a tungsten filament mounted within said envelope;
   (c) a fill within said envelope, said fill including bromine, phosphorus, carbon, and an inert gas, wherein the phosphorus to carbon mass ratio is in the range of approximately 10:1 to 1:1, and
   (d) means for structurally and electrically completing said lamp.

* * * * *